(12) United States Patent
Fukatsu (10) Patent No.: US 8,419,105 B2
(45) Date of Patent: Apr. 16, 2013

(54) SUNVISOR FOR VEHICLE

(75) Inventor: Tsuyoshi Fukatsu, Toyota (JP)

(73) Assignee: Kyowa Sangyo Co., Ltd., Toyota (JP)

( * ) Notice: Subject to any disclaimer, the term of this patent is extended or adjusted under 35 U.S.C. 154(b) by 0 days.

(21) Appl. No.: 13/289,359

(22) Filed: Nov. 4, 2011

(65) Prior Publication Data
US 2012/0119537 A1   May 17, 2012

(30) Foreign Application Priority Data

Nov. 12, 2010   (JP) ................................. 2010-254052

(51) Int. Cl.
*B60J 3/02*   (2006.01)
(52) U.S. Cl.
USPC ........................................................ 296/97.1
(58) Field of Classification Search ................ 296/97.1, 296/97.2, 97.8; *B60J 3/02*
See application file for complete search history.

(56) References Cited

U.S. PATENT DOCUMENTS

| | | | | |
|---|---|---|---|---|
| 3,128,121 A | * | 4/1964 | Greig | 296/97.1 |
| 3,827,748 A | * | 8/1974 | Herr et al. | 296/97.1 |
| 4,163,579 A | * | 8/1979 | Mahler et al. | 296/97.1 |
| 4,998,767 A | * | 3/1991 | Lawassani et al. | 296/97.1 |
| 5,131,711 A | * | 7/1992 | Laferle | 296/97.1 |
| 5,580,118 A | * | 12/1996 | Crotty, III | 296/97.12 |
| 6,094,785 A | * | 8/2000 | Montgomery et al. | 24/324 |
| 6,557,920 B1 | * | 5/2003 | Hobson et al. | 296/97.1 |
| 6,634,696 B1 | * | 10/2003 | Tiesler | 296/97.1 |
| 6,692,059 B1 | * | 2/2004 | Mills | 296/97.1 |
| 6,698,815 B1 | * | 3/2004 | Mills et al. | 296/97.2 |
| 2004/0066056 A1 | * | 4/2004 | Mills et al. | 296/97.1 |
| 2006/0087147 A1 | * | 4/2006 | Kleyn | 296/97.1 |
| 2007/0120388 A1 | * | 5/2007 | Araga et al. | 296/97.1 |
| 2008/0093876 A1 | * | 4/2008 | Olep et al. | 296/97.11 |
| 2010/0001548 A1 | * | 1/2010 | Okazaki | 296/97.2 |

FOREIGN PATENT DOCUMENTS

| | | |
|---|---|---|
| JP | U-63-12431 | 1/1988 |
| JP | A-2004-122528 | 4/2004 |
| JP | A-2005-047322 | 2/2005 |
| JP | A-2007-008233 | 1/2007 |

* cited by examiner

*Primary Examiner* — Glenn Dayoan
*Assistant Examiner* — Pinel Romain
(74) *Attorney, Agent, or Firm* — Oliff & Berridge, PLC (57) ABSTRACT

A sun visor for a vehicle has a sun visor body including a first shell and a second shell. The first shell includes a pin, and the second shell includes a boss having an insert hole. Further, a first reinforcing portion that extends in a given direction from at least one of the pin and the boss and a second reinforcing portion that extends in a direction intersecting with the direction of extension of the first reinforcing portion are provided.

9 Claims, 7 Drawing Sheets

SUNVISOR FOR VEHICLE

INCORPORATION BY REFERENCE

The disclosure of Japanese Patent Application No. 2010-254052 filed on Nov. 12, 2010 including the specification, drawings and abstract is incorporated herein by reference in its entirety.

BACKGROUND OF THE INVENTION

1. Field of the Invention

The invention relates to a sun visor for a vehicle.

2. Description of the Related Art

In a known arrangement of a sun visor for a vehicle, two shells into which a sun visor body is divided in the thickness direction are joined to each other via a suitable joining or coupling portion(s), to provide the sun visor body. In a sun visor for a vehicle as disclosed in Japanese Patent Application Publication No 2005-47322, for example, an arrangement in which bosses provided on one of the shells are press-fitted into pins provided on the other shell is used as the joining portions.

SUMMARY OF THE INVENTION

In the vehicular sun visor of the above type, when the shells of the sun visor body are joined together, a crack may be formed in a boss due to stress produced when a pin is press-fitted into the boss. Also, abnormal sound or noise may occur due to stress applied to the sun visor body in a condition where the crack is formed. On the other hand, when a pin is press-fitted into a boss, radial stress is applied to the pin, and the pin may be inclined by an amount equal to or larger than a given amount, which may result in breakage of the pin.

The present invention provides a sun visor for a vehicle in which the durability of a structure for joining shells that constitute a sun, visor body is improved.

The invention can be applied to various types of vehicular sun visors using a press-fitted structure of pins having projections and bosses having recesses or holes, for joining shells that constitute a sun visor body.

A sun visor for a vehicle according to one aspect of the invention includes a sun visor body, first shell and second shell, pin, boss, a first reinforcing portion, and a second reinforcing portion.

The sun visor body forms the outline of the sun visor for the vehicle. The sun visor body includes a shell member covered with a skin. The shell member includes a first shell and a second shell. The first shell and second shell may be formed as generally rectangular members, which may be made of a hard resin material. The pin having a rod shape is provided on the first shell so as to protrude therefrom. The cross-sectional shape of the pin may be selected from appropriate shapes, such as circular, triangular, polygonal, and elliptic shapes. The boss is provided on the second shell so as to protrude therefrom. The boss has an insert hole into which the pin is press-fitted when the second shell is joined to the first shell. The shape of the insert hole of the boss may be selected from appropriate shapes, so as to provide, a recess corresponding to the shape of the pin as a projection. The pin and the boss may be formed by integral molding on the corresponding shells, or may be joined to the corresponding shells by a suitable method other than integral molding.

The first reinforcing portion as a protruding portion is provided on at least one of the first shell and the second shell in a protruding condition, and extends in a given direction from at least one of the pin and the boss. The first reinforcing portion reinforces at least one of the pin and the boss. The second reinforcing portion as a protruding portion is provided on at least one of the first shell and the second shell in a protruding condition, and is located apart from the pin or the boss. The second reinforcing portion is provided on the first reinforcing portion while extending in a direction intersecting with a direction in which the first reinforcing portion extends. The second reinforcing portion further reinforces the first reinforcing portion that directly reinforces the pin or the boss, so as to indirectly reinforce the pin or the boss. In particular, the arrangement of the second reinforcing portion extending while intersecting with the first reinforcing portion yields a high reinforcing effect. The first reinforcing portion and the second reinforcing portion may be formed by integral molding on the first shell and the second shell, or may be joined to the first shell and the second shell by a method other than integral molding.

When the first reinforcing portion and the second reinforcing portion are provided on the second shell, the first reinforcing portion and the second reinforcing portion cooperate with each other to receive stress applied in a radial direction of the pin to the boss when the pin is press-fitted into the insert hole of the boss, so as to restrict expansion of the boss.

With the above arrangement, when the pin is press-fitted into the insert hole of the boss, the first reinforcing portion and the second reinforcing portion can cooperate with each other to suppress or prevent expansion of the boss by a given amount or more in radial directions of the pin. Consequently, the durability of the structure for joining the shells can be improved. For example, it is possible to eliminate a problem that a crack is formed in the boss due to stress produced when the pin is press-fitted into the insert hole of the boss, and a problem that abnormal sound occurs when stress is applied to the sun visor body while the crack is formed.

When the first reinforcing portion and the second reinforcing portion are provided on the first shell, the first reinforcing portion and the second reinforcing portion cooperate with each other to receive stress produced in a radial direction of the pin when the pin is press-fitted into the insert hole of the boss, so as to restrict movement of the pin in the radial direction.

With the above arrangement, when the pin is press-fitted into the insert hole of the boss; the first reinforcing portion and the second reinforcing portion can cooperate with each other to suppress or prevent movement (movement due to bending or deflection) of the pin by a given amount or more in the radial direction of the pin. As a result, the durability of the structure for joining the shells can be improved. For example, when the pin is press-fitted into the insert hole of the boss, breakage of the pin, which would occur due to radial stress applied to the pin, can be prevented.

Also, when the pin is press-fitted into the insert hole of the boss, the second reinforcing portion and the first reinforcing portion may abut on each other in a condition where the second reinforcing portion intersects with the first reinforcing portion, so as to position the first shell relative to the second shell in a direction in which the pin is press-fitted. With this arrangement, when the pin is press-fitted into the insert hole of the boss, the second reinforcing portion surely abuts on the first reinforcing portion, so that the first shell and the second shell can be positioned relative to each other.

In other words, the second reinforcing portion and the first reinforcing portion inhibit the first shell and the second shell from moving in a direction in which the first and second shells get closer to each other, from the mutually abutting positions, so as to function as a stopper for keeping the spacing between the first shell and the second shell constant. Also, the first reinforcing portion of the first shell and the second reinforcing portion of the second shell can be reasonably utilized for positioning the first shell and the second shell. Also, the second reinforcing portion may abut on the first reinforcing portion at least two locations.

In the sun visor for a vehicle as described above, the pin may have a hollow interior. An inside diameter of the insert hole of the boss may be smaller than an outside diameter of the pin. An outside diameter of the pin may be reduced from a proximal portion of the pin toward a distal portion of the pin.

In the sun visor for a vehicle as described above, the first shell may have a first mating face as an edge portion of the first shell, and the second shell may have a second mating face as an edge portion of the second shell. In this case, the first reinforcing portion and the second reinforcing portion may be provided on at least one of the first shell and the second shell, independently of the first mating fate and the second mating face.

As described above, in the sun visor for a vehicle, the durability of the structure for joining the shells that constitute the sun visor body is improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
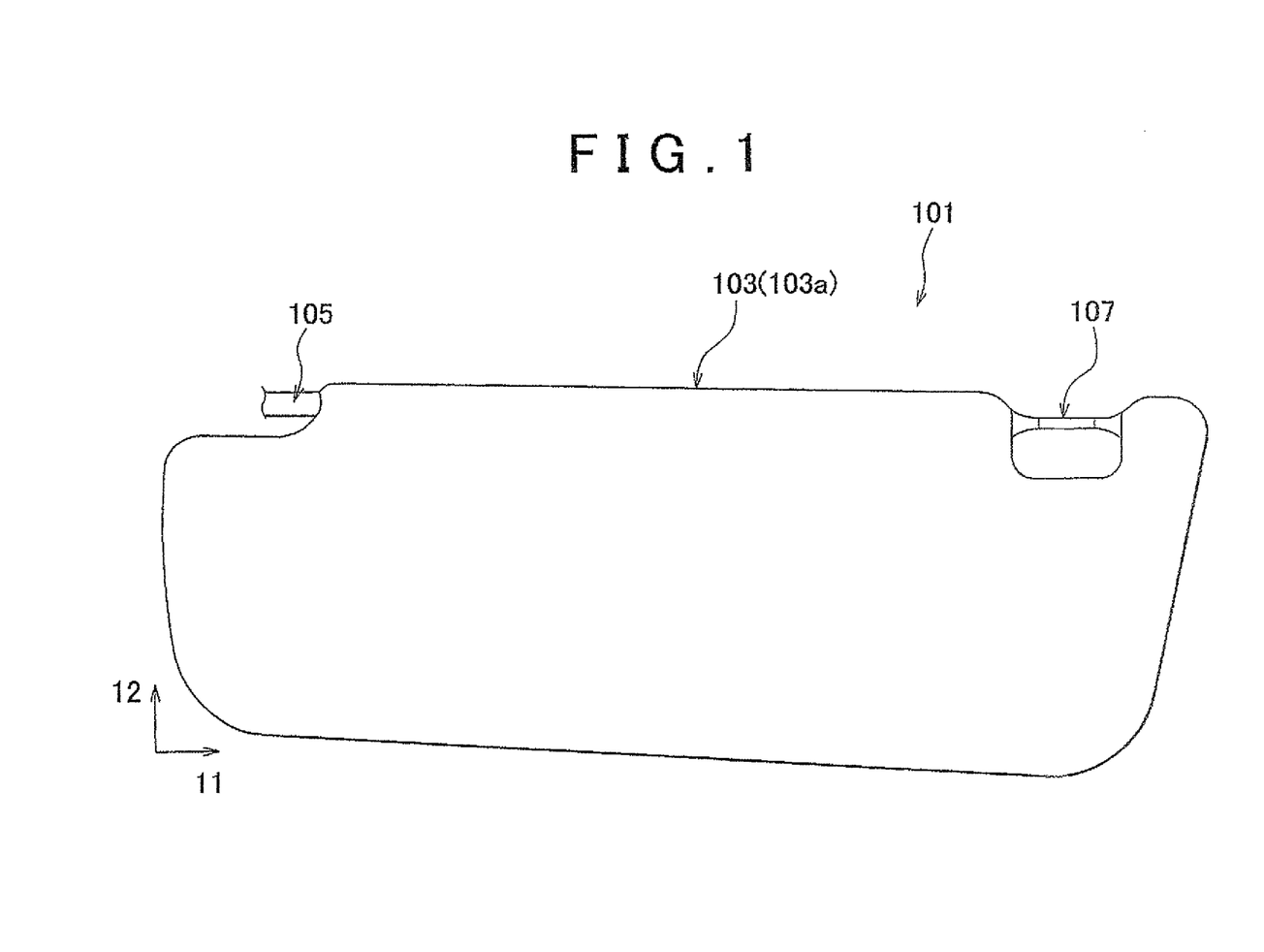
FIG. 1 is a plan view showing the overall construction of a sun visor for a vehicle according to a first embodiment of the invention.

A sun visor for a vehicle according to a first embodiment of the invention will be described in detail with reference to the drawings. In FIG. 1, the overall construction of the vehicular sun visor 101 is illustrated in a flat view.

The vehicular sun visor 101 of the first embodiment is installed in the vicinity of the top of the windshield of the vehicle. As shown in FIG. 1, the vehicular sun visor 101 includes a sun visor body 103, a pivot shaft 105, a support shaft 107, and a mounting bracket (not shown).

The sun visor body 103 forms the outline or profile of the vehicular sun visor 101. The sun visor body 103 includes a shell member 103a, and a skin that covers the outer surface of the shell member 103a. The shell member 103a is a generally rectangular member having a suitable thickness. As shown in FIG. 1, the shell member 103a has long sides that extend in a first direction 11, and short sides that extend in a second direction 12 that intersects at substantially right angles with the first direction 11.

The pivot shaft 105 rotatably supports the sun visor body 103. The mounting bracket for mounting the pivot shaft 105 onto the vehicle is provided on the pivot shaft 105. The support shaft 107 is arranged to engage with a hook mounted on the ceiling of the vehicle compartment, so as to be pivotably retained in position.

Referring next to FIG. 2 through FIG. 7, the specific structure of the shell member 103a of the sun visor body 103 as described above will be described in detail.

Figure 2:
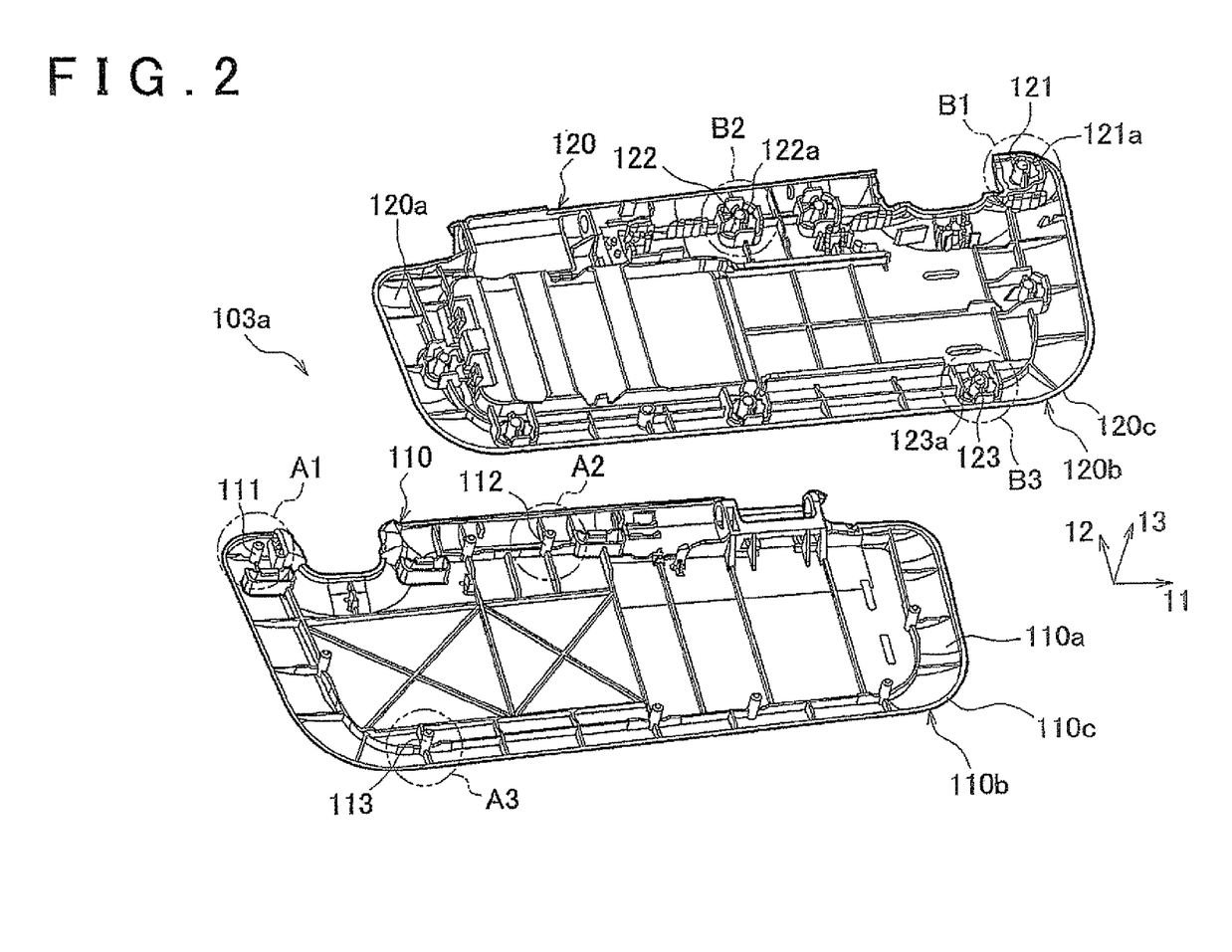
FIG. 2 is an exploded perspective view of a shell member of a sun visor body of FIG. 1.

FIG. 2 is a perspective view showing an exploded condition of the shell member 103a that constitutes the sun visor body 103 of FIG. 1. The shell member 103a shown in FIG. 2 includes generally rectangular first shell 110 and second shell 120. The first shell 110 and the second shell 120 are joined to each other, to form a hollow space therein. More specifically, the first shell 110 and the second shell 120 are superposed on each other such that the back side 110a of the first shell 110 and the back side 120a of the second shell 120 are opposed to each other, and these shells 110, 120 are joined together so as to form the shell member 103a of the sun visor body 103. More specifically, when the back side 110a of the first shell 110 and the back side 120a of the second shell 120 are superimposed on each other, a first region A1 of the first shell 110 and a first region B1 of the second shell 120 are opposed to each other, and a second region A2 of the first shell 110 and a second region B2 of the second shell 120 are opposed to each other, while a third region A3 of the first shell 110 and a third region B3 of the second shell 120 are opposed to each other. Like the shell member 103a, the first shell 110 and the second shell 120 have long sides that extend in the first direction 11, and short sides that extend in the second direction 12 that intersects at substantially right angles with the first direction 11.

Next, the construction of the first shell 110 will be described. On the back side 110a of the first shell 110, a first mating face 110c to be faced to the second shell 120 is formed on an edge portion 110b that extends along the outline of the first shell 110. When the first shell 110 and the second shell 120 are joined together, the first mating face 110c abuts on and mates to a second mating face 120c of the second shell 120. In the first shell 110, pins and reinforcing portions (such as walls or ribs) are provided at a plurality of locations on the back side 110a so as to protrude from the back side 110a. For example, on the backside 110a of the first shell 110 of FIG. 2, a pin 111 having a rod shape is erected on the first region A1, and a pin 112 having a rod shape is erected on the second region A2, while a pin 113 having a rod shape is erected on the third region A3. Each of the pins (or projections) 111, 112, 113 is a rod member having a circular cross-section, and is formed by integral molding on the first shell 110. The pins 111, 112, 113 extend in a third direction 13 that intersects at substantially right angles with both of the first direction 11 and the second direction 12. The pins 111, 112, 113 may have a hollow structure having a space formed therein, or may have a solid structure having no space therein.

Figure 3:
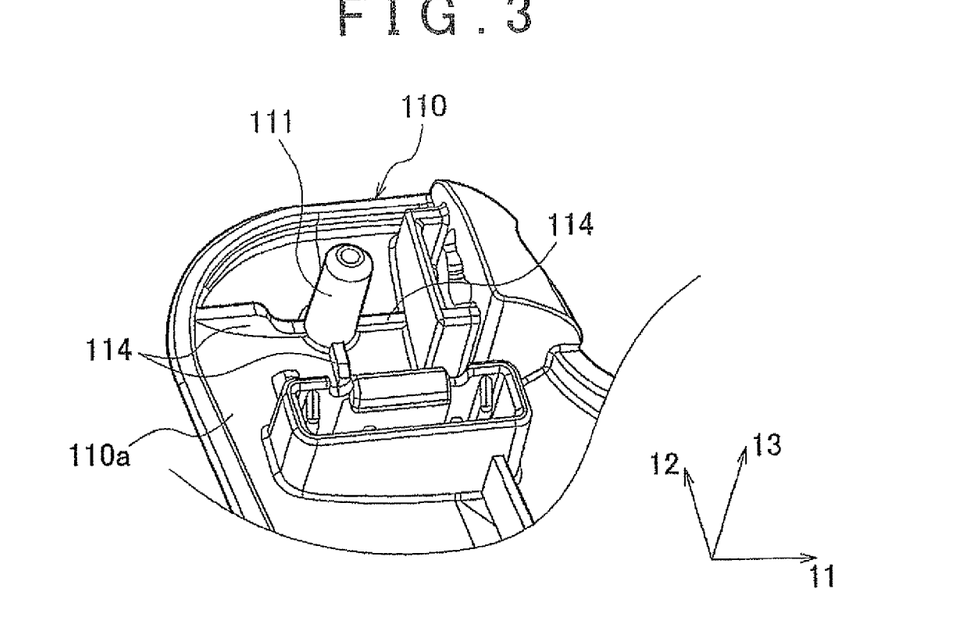
FIG. 3 is an enlarged view of a first region A1 on the back side of a first shell of FIG. 2.
Figure 4:
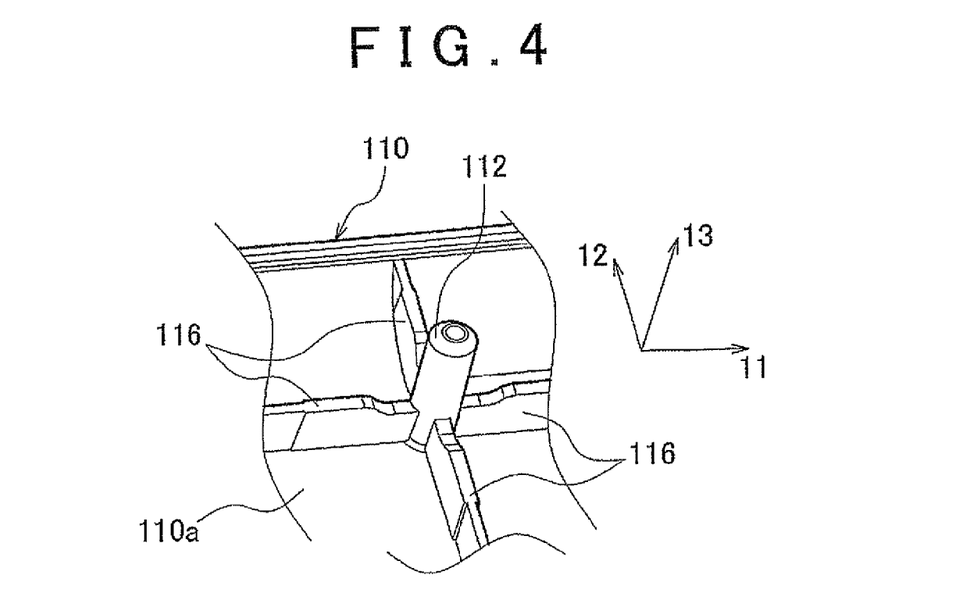
FIG. 4 is an enlarged view of a second region A2 on the back side of the first shell of FIG. 2.
Figure 5:
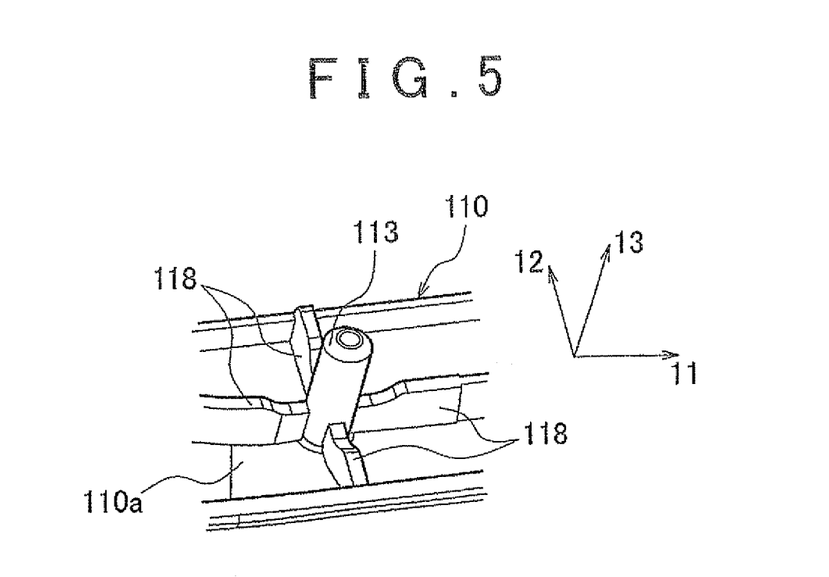
FIG. 5 is an enlarged view of a third region A3 on the back side of the first shell of FIG. 2.

In the first shell 110 constructed as described above, the pins 111, 112, 113 and their surrounding structures, in particular, are illustrated in FIG. 3-FIG. 5. FIG. 3-FIG. 5 are partial enlarged views of the respective pins of FIG. 2 and their surroundings.

As shown in FIG. 3, two or more first walls 114 that extend in radial directions of the pin 111 from the outer periphery of the pin 111 are provided on the first region A1 of the back side 110a of the first shell 110 so as to protrude from the back side 110a. In the first embodiment, in particular, each of the first walls 114 is a wall that has a plate shape and is formed by integral molding on the first shell 110. Each of the first walls 114 extends in the first direction 11 or the second direction 12 with a certain wall length as measured from the outer periphery of the pin 111. Also, each of the first walls 114 has a certain wall height as measured in the third direction 13. The first walls 114, which extend integrally from the outer periphery of the pin 111, function as first reinforcing portions for reinforcing the pin 111.

As shown in FIG. 4, two or more first walls 116 that extend in radial directions of the pin 112 from the outer periphery of the pin 112 are provided on the second region A2 of the back side 110a of the first shell 110 so as to protrude from the back side 110a. In the first embodiment, in particular, each of the first walls 116 is a wall that has a plate shape and is formed by integral molding on the first shell 110. Each of the first walls 116 extends in the first direction 11 or the second direction 12 with a certain wall length as measured from the outer periphery of the pin 112. Also, each of the first walls 116 has a certain wall height as measured in the third direction 13. The first walls 116, which extend integrally from the outer periphery of the pin 112, function as first reinforcing portions for reinforcing the pin 112.

As shown in FIG. 5, two or more first walls 118 that extend in radial directions of the pin 113 from the outer periphery of the pin 113 are provided on the third region A3 of the back side 110a of the first shell 110 so as to protrude from the back side 110a. In the first embodiment, in particular, each of the first walls 118 is a wall that has a plate shape and is formed by integral molding on the first shell 110. Each of the first walls 118 extends in the first direction 11 or the second direction 12 with a certain wall length as measured from the outer periphery of the pin 113. Also, each of the first walls 118 has a certain wall height as measured in the third direction 13. The first walls 118, which extend integrally from the outer periphery of the pin 113, function as first reinforcing portions for reinforcing the pin 113. The first walls 118, and the above-indicated first walls 114, 116, are all provided independently of the edge portion 110b (the first mating face 110c) of the first shell 110, and these walls constitute the first reinforcing portions for reinforcing the pins.

Next, the construction of the second shell 120 will be described. On the back side 120a of the second shell 120, the second mating face 120c to be joined to the first shell 110 is formed on an edge portion 120b that extends along the outline of the second shell 120. When the first shell 110 and the second shell 120 are joined together, the second mating face 120c abuts on and mates to the first mating face 110c of the first shell 110. In the second shell 120, bosses and reinforcing portions (such as walls or ribs) are provided at a plurality of locations on the back side 120a so as to protrude from the back side 120a. The bosses have insert holes into which the above-described pins of the first shell 110 are press-fitted when the first shell 110 and the second shell 120 are joined together. For example, on the back side 120a of the second shell 120 of FIG. 2, a boss 121 having an insert hole 121a is erected on the first region B1, and a boss 122 having an insert hole 122a is erected on the second region 132, while a boss 123 having an insert hole 123a is erected on the third region 133. Each of the bosses 121, 122, 123 is formed by integral molding on the second shell 120, as a generally cylindrical portion having an insert hole of a circular cross-section. The bosses 121, 122, 123 extend in a third direction 13 that intersects at substantially right angles with both of the first direction 11 and the second direction 12.

Figure 6:
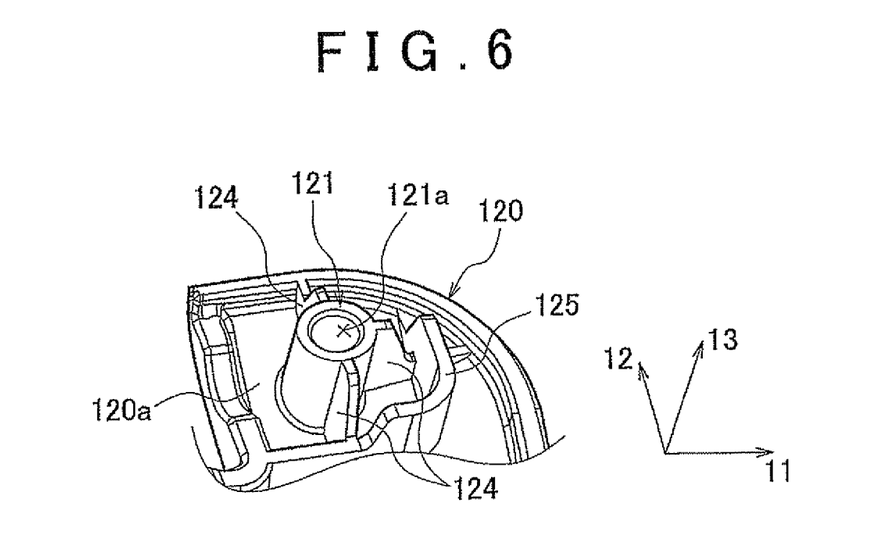
FIG. 6 is an enlarged view of a first region B1 on the back side of a second shell of FIG. 2.
Figure 7:
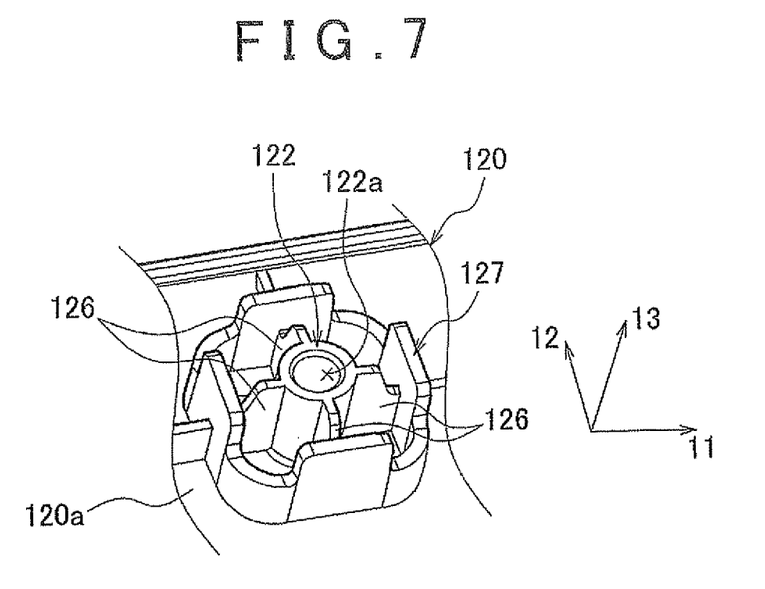
FIG. 7 is an enlarged view of a second region B2 on the back side of the second shell of FIG. 2.
Figure 8:
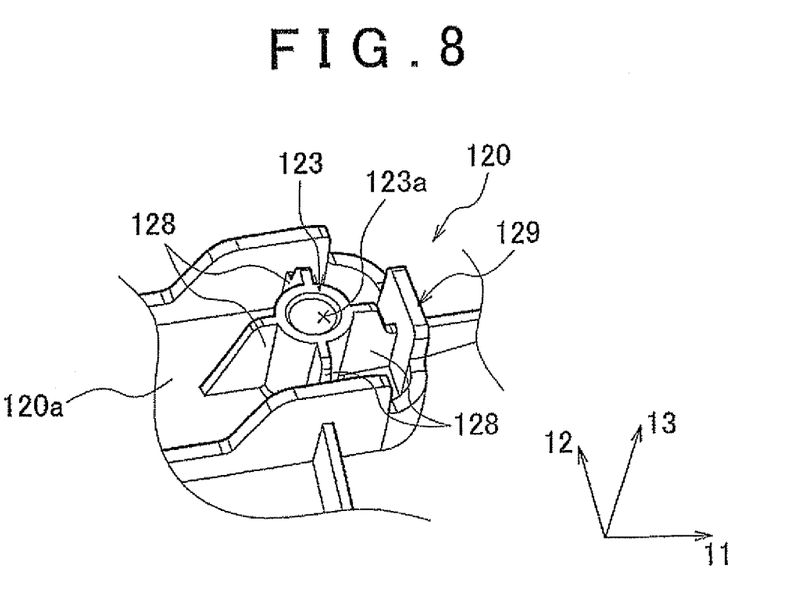
FIG. 8 is an enlarged view of a third region B3 on the back side of the second shell of FIG. 2.

In the second shelf 120 constructed as described above, the bosses 121, 122, 123 and their surrounding structures, in particular, are illustrated in FIG. 6-FIG. 8. FIG. 6-FIG. 8 are partial enlarged views of the respective bosses of FIG. 2 and their surroundings.

When the first shell 110 and the second shell 120 are joined together, the pin 111 of the first shell 110 is press-fitted into the insert hole 121a of the boss 121 shown in FIG. 6, so that an immovably engaging action (or retaining action) takes place between the pin 111 and the boss 121. To this end, the inside diameter of the insert hole 121a of the boss 121 substantially coincides with the outside diameter of the pin 111, or is made slightly smaller than the outside diameter of the pin 111. With this arrangement, a high joining or coupling effect can be obtained at the time of press-fitting.

Also, two or more first walls 124 and a second wall 125 are provided on the first region B1 of the back side 120a of the second shell 120 so as to protrude from the back side 120a. Each of the first walls 124 is provided on the outer wall of the boss 121 while extending in a certain direction. In the first embodiment, in particular, each of the first walls 124 is a wall that has a plate shape and is formed by integral molding on the second shell 120. Each of the first walls 124 extends in the first direction 11 or the second direction 12 with a certain wall length as measured from the outer wall of the boss 121. Also, each of the first walls 124 has a certain wall height as measured in the third direction 13.

On the other hand, the second wall 125 is located apart from the boss 121, and is formed integrally with each of the first walls 124 while extending in a direction intersecting with a direction in which the first wall 124 extends. In the first embodiment, in particular, the second wall 125 is a wall that has a plate shape and is formed by integral molding on the second shell 120. The second wall 125 extends while intersecting with each of the first walls 124, so as to surround the boss 121, and has a certain wall height along the third direction 13. The second wall 125 may be a single, continuous plate-shaped wall (a wall that has a plate shape and extends in a closed shape) which is common to the two or more first walls 124 as shown in FIG. 6. Alternatively, the second wall 125 in may consist of two or more plate-shaped walls provided independently with respect to the respective first walls 124.

When the first shell 110 and the second shell 120 are joined together, the pin 112 of the first shell 110 is press-fitted into the insert hole 122a of the boss 122 shown in FIG. 7, so that an immovably engaging action (or retaining action) takes place between the pin 112 and the boss 122. To this end, the inside diameter of the insert hole 122a of the boss 122 substantially coincides with the outside diameter of the pin 112, or is made slightly smaller than the outside diameter of the pin 112. With this arrangement, a high joining or coupling effect can be obtained at the time of press-fitting.

Also, two or more first walls 126 and a second wall 127 are provided on the second region B2 of the back side 120a of the second shell 120 so as to protrude from the back side 120a. Each of the first walls 126 is provided integrally on the outer wall of the boss 122 while extending in a certain direction. In the first embodiment, in particular, each of the first walls 126 is a wall that has a plate shape and is formed by integral molding on the second shell 120. Each of the first walls 126 extends in the first direction 11 or the second direction 12 with a certain wall length as measured from the outer wall of the boss 122. Also, each of the first walls 126 has a certain wall height as measured in the third direction 13.

On the other hand, the second wall 127 is located apart from the boss 122, and is formed integrally with each of the first walls 126 while extending in a direction intersecting with a direction in which the first wall 126 extends. In the first embodiment, in particular, the second wall 127 is a wall that, has a plate shape and is formed by integral molding on the second shell 120. The second wall 127 extends while intersecting with each of the first walls 126, so as to surround the boss 122, and has a certain wall height along the third direction 13. The second wall 127 may be a single, continuous plate-shaped wall (a wall that has a plate shape and extends in a closed shape) which is common to the two or more first walls 126 as shown in FIG. 7. Alternatively, the second wall 127 may consist of a plurality of plate-shaped walls provided independently with respect to the respective first walls 126.

When the first shell 110 and the second shell 120 are joined together, the pin 113 of the first shell 110 is press-fitted into the insert hole 123a of the boss 123 shown in FIG. 8, so that an immovably engaging action (or retaining action) takes place between the pin 113 and the boss 123. To this end, the inside diameter of the insert hole 123a of the boss 123 substantially coincides with the outside diameter of the pin 113, or is made slightly smaller than, the outside diameter of the pin 113. With this arrangement, a high joining or coupling effect can be obtained at the time of press-fitting.

Also, two or more first walls 128 and a second wall 129 are provided on the third region B3 of the back side 120a of the second shell 120 so as to protrude from the back side 120a. Each of the first walls 128 is provided integrally on the outer wall of the boss 123 while extending in a certain direction. In the first embodiment, in particular, each of the first walls 128 is a wall that has a plate shape and is formed by integral molding on the second shell 120. Each of the first walls 128 extends in the first direction 11 or the second direction 12 with a certain wall length as measured from the outer wall of the boss 123. Also, each of the first walls 128 has a certain wall height as measured in the third direction 13. The first walls 128, and the above-indicated first walls 124, 126, are all provided independently of the edge portion 120b (the second mating face 120c) of the second shell 120, and the first walls constitute the first reinforcing portions for reinforcing the bosses.

On the other hand, the second wall 129 is located apart from the boss 123, and is formed integrally with each of the first walls 128 while extending in a direction intersecting with a direction in which the first wall 128 extends. In the first embodiment, in particular, the second wall 129 is a wall that has a plate shape and is formed by integral molding on the second shell 120. The second wall 129 extends while intersecting with each of the first walls 128, so as to surround the boss 123, and has a certain wall height along the third direction 13. The second wall 129 may be a single, continuous plate-shaped wall (a wall that has a plate shape and extends in a closed shape) which is common to the two or more first walls 128 as shown in FIG. 8. Alternatively, the second wall 129 may consist of a plurality of plate-shaped walls provided independently with respect to the respective first walls 128.

The second wall 129, and the above-indicated second walls 125, 127, are all provided independently of the edge portion 120b (the second mating face 120c) of the second shell 120, and the second walls constitute second reinforcing portions for reinforcing the first walls (the first reinforcing portions) of the bosses as described above. Namely, in the first embodiment, the first reinforcing portions are reinforcing walls that directly extend from the pins and the bosses, and the second reinforcing portions are walls for indirectly reinforcing the bosses via the first reinforcing portions.

Figure 9:
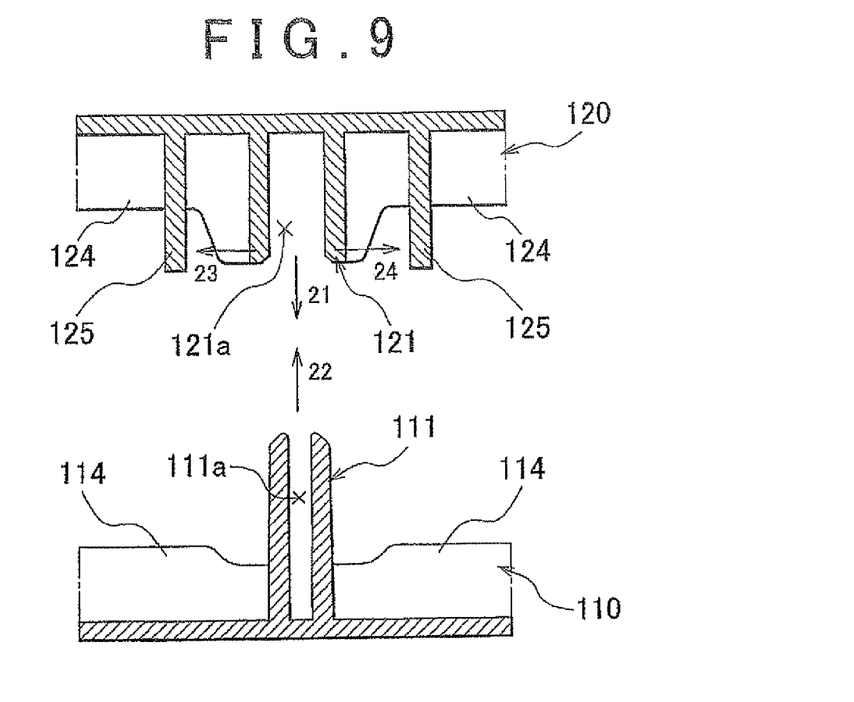
FIG. 9 is a partial cross-sectional view showing a pin of the first region A1, a boss of the first region B1, and their vicinities, in a condition where the first shell and the second shell of the first embodiment have not been joined to each other.
Figure 10:
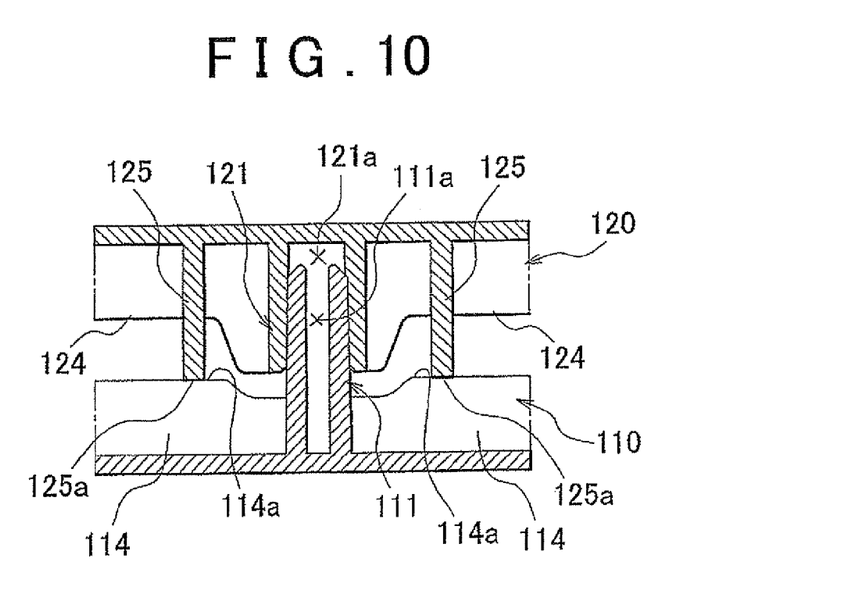
FIG. 10 is a partial cross-sectional view showing the pin of the first region A1, the boss of the first region B1, and their vicinities, in a condition where the first shell and the second shell of the first embodiment are joined to each other.

The operation to press-fit the pins into the bosses when the first shell 100 and the second shell 120 constructed as described above are joined together will be described with reference to FIG. 9 and FIG. 10. FIG. 9 shows a cross-sectional structure of the first region A1 and first region B1, in a condition where the first shell 110 and second shell 120 of the first embodiment have not been joined together. FIG. 10 shows a cross-sectional structure of the pin 111, boss 121 and their vicinities, as one example, in a condition where the first shell 110 and second shell 120 of the first embodiment are joined to each other.

When the first shell 110 and the second shell 120 are joined together, the first mating face 110c of the first shell 110 is mated with the second mating face 120c of the second shell 120, and each of the pins is engaged with the corresponding one of the bosses. More specifically; the pin 111 is press-fitted into the insert hole 121a of the boss 121, as indicated by arrows 21 and 22 in FIG. 9. During the press-fitting operation, the boss 121 is expanded by the pin 111 within a range below a given amount, against the flexural rigidity of the resin material, whereby a high joining or coupling effect can be obtained. In this connection, a hollow portion 111a that extends in the axial direction of the pip 111 may be formed inside the pin 111 as shown in FIG. 9, so that the pin 111 is likely to elastically deflect during press-fitting. On the other hand, during the press-fitting operation, the first walls 124 and the second wall 125 cooperate to receive stresses applied to the boss 121 in radial directions of the pin 111 (which are also radial, directions of the boss 121), thereby to restrict expansion of the boss 121 in directions indicated by arrows 23 and 24 in FIG. 9. Namely, the first walls 124 and the second wall 125 constitute an expansion restricting portion for the boss 121. Thus, the second wall 125 reinforces the first walls 124 that directly reinforce the outer wall of the boss 121, so as to indirectly reinforce the outer wall of the boss 121. In particular, the second wall 125, which extends in directions intersecting with the first walls 124, yields a high reinforcing effect.

With the above arrangement, the boss 121 can be prevented from expanding (or being pushed outward) by a given amount or more in the radial directions of the pin 111. Consequently, the durability of the structure for joining the first shell 110 and the second shell 120 can be improved. For example, it is possible to eliminate a problem that a crack is formed in the boss 111, due to stress applied to the boss 111 when the pin 111 is press-fitted into the insert hole 121a of the boss 111, and a problem that abnormal sound or noise is generated when stress is applied to the sun visor body 103 in a condition where the crack is formed. Also, in the first embodiment, the pin 111 is reinforced by the first walls 114 in the first shell 110; therefore, the durability of the structure for joining the first shell 110 and the second shell 120 can be further improved.

As shown in FIG. 10, when joining of the first shell 110 and the second shell 120 is completed, the first walls 114 of the first shell 110 and the second wall 125 of the second shell 120 abut on each other while intersecting with each other.

Namely, top edge portions 114a of the first walls 114 abut on a top edge portion 125a of the second wall 125. In addition, the second wall 125 abuts on the first walls at two locations. With the first walls 114 thus abutting on the second wall 125, the first shell 110 is positioned relative to the second shell 120, in the direction in which the pin 111 is press-fitted. In addition, since the second wall 125 abuts on the first walls at least two locations, inclination of the pin 111 with respect to the boss 121 can be prevented while the first shell 110 positioning relative to the second shell 120. In the first embodiment, in particular, the top edge portion 125a of the second wall 125 of the second shell 120 functions as a mating face that mates with the top edge portions 114a of the first walls 114 of the first shell 110, and the second wall 125 also cooperates with the first walls 124 of the boss 121 to function as the above-mentioned expansion restricting portion. The first walls 114 of the first shell 110 and the second wall 125 of the second shell 120 may be arranged as needed to abut on each other while extending in the same direction.

With the above-described arrangement, when the pin 111 is press-fitted into the insert hole 121a of the boss 121, the top edge portions 114a of the first walls 114 and the top edge portion 125a of the second wall 125 are surely brought into abutment with each other, so that the first shell 100 and the second shell 120 can be positioned in the direction of press-fitting. In other words, the first walls 114 and the second wall 125 inhibit the first shell 110 and the second shell 120 from moving in directions (directions of arrows 21 and 22 in FIG. 9) in which the first and second shells 110, 120 get closer to each other, from the mutually abutting positions. Namely, the first walls 114 and the second wall 125 function as a stopper for keeping the spacing between the first shell 110 and the second shell 120 as measured in the direction of the thickness of the shell member 103a constant. Also, the first walls 114 of the first shell 110 and the second wall 125 of the second shell 120 can be reasonably utilized for positioning the first shell 110 relative to the second shell 120.

The operation and effects as explained above with regard to the pin 111 and the boss 121, referring to FIG. 9 and FIG. 10, are substantially the same as the operations and effects regarding the other pins 112, 113 and bosses 122, 123. However, the other pins 112, 113 and the bosses 122, 123 are different from the pin 111 and the boss 121 as described below. When the pin 112 is press-fitted into the insert hole 121a of the boss 122, the second wall 127 abuts on four first walls 116 while intersecting with each other. Similarly, when the pin 113 is press-fitted into the insert hole 123a of the boss 123, the second wall 129 abuts on three first walls 118 while intersecting with each other. Since the second walls 127, 129 abut on the first walls 116, 118 at least two locations, inclination of the pins 112, 113 with respect to the bosses 122, 123 can be prevented respectively while the first shell 110 positioning relative to the second shell 120.

Figure 11:
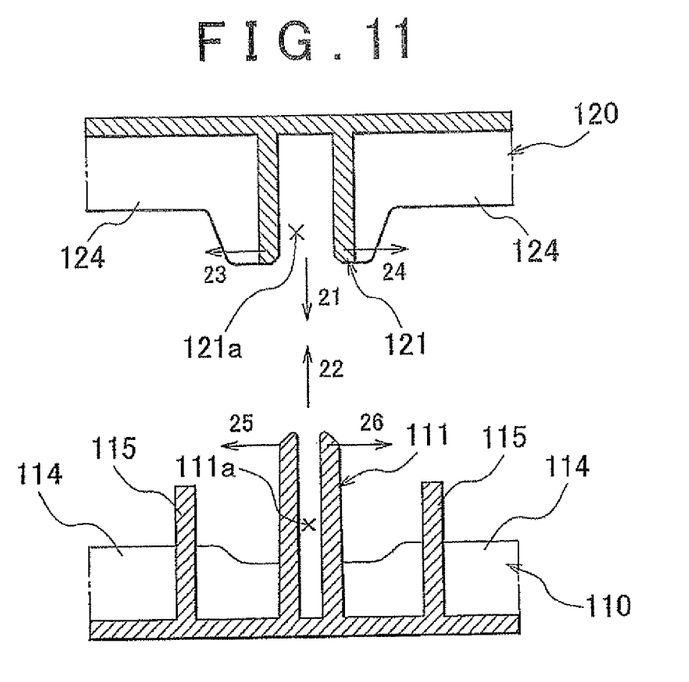
FIG. 11 is a partial cross-sectional view showing a pin of a first region A1, a boss of a first region B1, and their vicinities, in a condition where first shell and second shell of a second embodiment of the invention have not been joined to each other.
Figure 12:
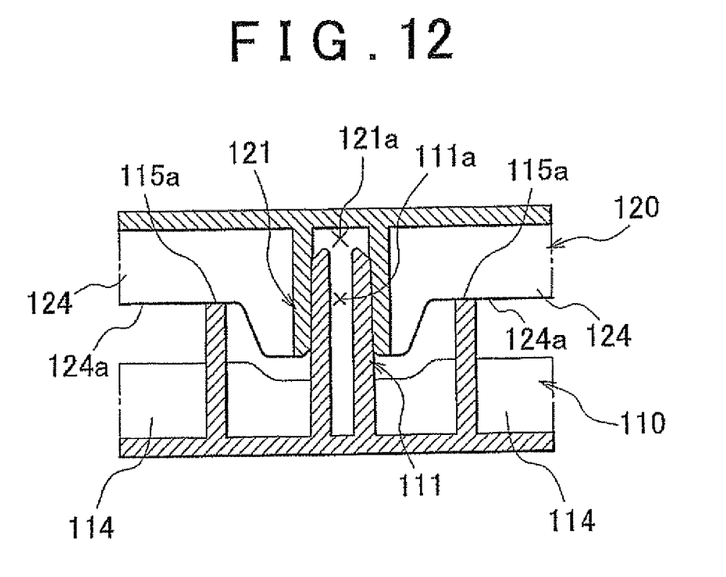
FIG. 12 is a partial cross-sectional view showing the pin of the first region A1, the boss of the first region B1, and their vicinities, in a condition where the first shell and second shell of the second embodiment are joined to each other.

As another embodiment of the invention, a second embodiment as shown in FIG. 11 and FIG. 12 may be employed, in place of the first embodiment as shown in FIG. 9 and FIG. 10. FIG. 11 shows a cross-sectional structure of the first region A1 and the first region B1, in a condition where the first shell 110 and second shell 120 of the second embodiment have not been joined together. FIG. 12 shows a cross-sectional structure of the pin 111, boss 121, and their vicinities, as one example, in a condition where the first shell 110 and second shell 120 of the second embodiment are joined to each other. In FIG. 11 and FIG. 12, the same reference numerals as used in FIG. 9 and FIG. 10 are assigned to the same constituent elements as those as shown in FIG. 9 and FIG. 10, and detailed description of the same constituent elements will not be provided.

In the second embodiment as shown in FIG. 11 and FIG. 12, a second wall 115 is further provided, in addition to the two or more first walls 114 that extend from the outer periphery of the pin 111, on the first region A1 of the back side 110a of the above-described first shell 110 so as to protrude from the back side 110a. The second wall 115 is located apart from the pin 111, and is formed integrally with each of the first walls 114 while extending a direction intersecting with a direction in which the first will 114 extends. In the second embodiment, in particular, the second wall 115 is a wall that has a plate shape and is formed by integral molding on the first shell 110. The second wall 115 extends while intersecting with each of the first walls 114, so as to surround the pin 111, and has a wall height along the above-mentioned third direction 13. The second wall 115 may be a single, continuous plate-shaped wall (a wall that has a plate shape and extends in a closed shape) which is common to the two or more first walls 114. Alternatively, the second wall 115 may consist of two or more plate-shaped walls provided independently or individually with respect to the respective first walls 114. The first walls 114 and the second wall 115 are provided independently of the edge portion 110b (the first mating face 110c) of the first shell 110, and the second wall constitutes a second reinforcing portion for reinforcing the first walls (the first reinforcing portions) of the above-indicated pin. On the other hand, only the two or more first walls 124 are provided on the first region B1 of the back side 120a of the above-indicated second shell 120 so as to protrude from the back side 120a. Namely, in the second embodiment, the first reinforcing portions are reinforcing walls that directly extend from the pin and the boss, and the second reinforcing portion is a wall that indirectly reinforces the pin via the first reinforcing portions.

In the second embodiment, when the pin 111 is press-fitted into the insert hole 121a of the boss 121, as indicated by arrows 21 and 22 in FIG. 11, the first walls 124 receive stresses applied to the boss 121 in radial directions of the pin 111 (radial directions of the boss 121), thereby to restrict expansion of the boss 121 in the directions of arrows 23 and 24. In this connection, the second wall 125 of the first embodiment may be added to the first walls 124, as needed, in order to strengthen the restriction of expansion of the boss 121. On the other hand, when, the pin 111 is press-fitted into the boss 121, the first walls 114 and the second wall 115 cooperate to receive stresses applied to the pin 11 in its radial directions (radial directions of the boss 121), thereby to restrict inclination of the pin 111 in the directions of arrows 25 and 26. Namely, the first walls 114 and the second wall 115 constitute an inclination restricting portion for the pin 111. At this time, the second wall 115 reinforces the first walls 114 that directly reinforce the outer periphery of the pin 11, so as to indirectly reinforce the outer periphery of the pin 111. In particular, the second wall 115, which extends while intersecting with the first walls 114, yields a high reinforcing effect.

With the above arrangement, it is possible to restrict or prevent inclination (bending or curving) of the pin 111 by a given amount or more in radial directions of the pin 111. As a result, the durability of the structure for joining the first shell 110 and the second shell 120 can be improved. For example, the pin 111 can be prevented from being broken due to stress produced when the pin 111 is press-fitted into the insert hole 121a of the boss 121. Also, since the boss 121 of the second shell 120 can be reinforced via the first walls 124, the durability of the structure for joining the first shell 110 and the second shell 120 can be further improved.

When joining of the first shell 110 and the second shell 120 is completed, as shown in FIG. 12, the second wall 115 of the first shell 110 and the first walls 124 of the second shell 120 abut on each other while intersecting with each other. Namely, the top edge portion 115a of the second wall 115 abuts on the top edge portions 124a of the first walls 124. With the first walls 124 thus abutting on the second wall 115, the first shell 110 is positioned relative to the second shell 120 in the direction in which the pin 111 is press-fitted. In the second embodiment, in particular, the top edge portion 115a of the second wall 115 of the first shell 110 functions as a mating face that mates with the top edge portions 124a of the first walls 124 of the second shell 120, and the second wall 115 also cooperates with the first walls 114 of the pin 111 to function as the above-mentioned inclination restricting portion. The second wall 115 of the first shell 110 and the first walls 124 of the second shell 120 may be arranged as needed to abut on each other while extending in the same direction.

With the above arrangement, when the pin 111 is press-fitted into the insert hole 121a of the boss 121, the top edge portion 115a of the second wall 115 and the top edge portions 124a of the first walls 124 are surely brought into abutment with each other, so that the first shell 100 and the second shell 120 can be positioned relative to each other in the direction of press-fitting. In other words, the second wall 115 and the first walls 124 inhibit the first shell 110 and the second shell 120 from moving in directions (directions of arrows 21 and 22 in FIG. 11) in which the first and second shells 110, 120 get closer to each other, from the mutually abutting positions. Namely, the second wall 115 and the first walls 124 function as a stopper for keeping the spacing between the first shell 110 and the second shell 120 as measured in the direction of the thickness of the shell member 103a constant. Also, the second wall 115 of the first shell 110 and the first walls 124 of the second shell 120 can be reasonably utilized for positioning the first shell 110 relative to the second shell 120.

In the first and second embodiments, the pins 111, 112, 113 have a circular cross-sectional shape, and the insert holes 121a, 122a, 123a of the bosses 121, 122, 123 also have a circular cross-sectional shape, as described above; however, the cross-sectional shape may be changed as needed to a triangular, polygonal, or elliptic shape, for example. Also, the outside diameter or inside diameter of the pins and the insert holes of the bosses may be constant along the direction of extension of each pin or boss, or may vary in the direction of extension of each pin or boss. For example, in order to improve the efficiency and ease with which the pin is initially press-fitted and inserted into the insert hole of the boss, the outside diameter of the pin may be reduced from its proximal portion toward its distal portion.

While the first reinforcing portions are provided for both of the pins and the bosses in the first and second embodiments, the first reinforcing portions may be provided only for the bosses in the first embodiment, and the first walls 114 of the pin 111 of FIG. 9, for example, may be eliminated as needed. Also, in the second embodiment, the first reinforcing portions may be provided only for the pins, and the first walls 124 of the boss 121 of FIG. 11, for example, may be eliminated as needed.

In the first embodiment, the first walls 114 of the first shell 110 and the second wall 125 of the second shell 120 are used for positioning the first shell 110 and the second shell 120 relative to each other. In the second embodiment, the second wall 115 of the first shell 110 and the first walls 124 of the second shell 120 are used for positioning the first shell 110 and the second shell 120. However, the function of positioning the first shell 110 and the second shell 120 may be accomplished by other portions than the above-indicated walls.

In the first and second embodiments, the pins 111, 112, 113 and first walls 114, 115, 116, 118 of the first shell 110, and the bosses 121, 122, 123, first walls 124, 126, 128 and second walls 125, 127, 129 of the second shell 120 are formed by integral molding on the corresponding shells. However, at least one of these portions may be provided by a joining method (such as welding, or bonding) other than integral molding.

In the first embodiment, the pins 111, 112, 113 and the first walls 114, 115 116, 118 are provided on the first shell 110, and the bosses 121, 122, 123, first walls 124, 126, 128, and the second walls 125, 127, 129 are provided on the second shell 120. This embodiment may be replaced by another embodiment in which portions corresponding, to the bosses 121, 122, 123, first walls 124, 126, 128 and the second walls 125, 127, 129 are provided on the first shell 110, and portions corresponding to the pins 111, 112, 113 and the first walls 114, 115, 116, 118 are provided on the second shell 120.

While the invention has been described in conjunction with specific embodiments thereof, it should be noted that suitable alterations, modifications, and variations will be apparent to those skilled in the art. Accordingly, example embodiments of the disclosure as set forth herein are intended to be illustrative, not limiting. The invention may be suitably modified without departing from the scope of the disclosure.

What is claimed is:

1. A sun visor for a vehicle, comprising:
   a sun visor body, wherein:
   the sun visor body includes a first shell and a second shell, and the first shell is joined to the second shell to provide the sun visor body;
   a pin has a rod shape and is provided on the first shell so as to protrude from the first shell;
   a boss is provided on the second shell so as to protrude from the second shell, and has an insert hole into which the pin is press-fitted when the second shell and the first shell are joined together;
   a first reinforcing portion is provided on at least one of the first shell and the second shell in a protruding condition, and extends in a given direction from at least one of the pin and the boss; and
   a second reinforcing portion is provided on at least one of the first shell and the second shell in a protruding condition, and is located apart from the pin or the boss, said second reinforcing portion being provided on the first reinforcing portion while extending in a direction intersecting with a direction of extension of the first reinforcing portion.

2. The sun visor for a vehicle according to claim 1, wherein the second reinforcing portion is provided on the second shell, and
   the first reinforcing portion and the second reinforcing portion are configured to cooperate with each other to receive stress applied in a radial direction of the pin to the boss when the pin is press-fitted into the insert hole of the boss, so as to restrict expansion of the boss.

3. The sun visor for a vehicle according to claim 1, wherein the second reinforcing portion is provided on the first shell, and
   the first reinforcing portion and the second reinforcing portion are configured to cooperate with each other to receive stress produced in a radial direction of the pin when the pin is inserted into the insert hole of the boss, so as to restrict inclination of the pin in the radial direction.

4. The sun visor for a vehicle according to claim 1, wherein the second reinforcing portion and the first reinforcing portion abut on each other in a condition where the second reinforcing portion provided on one of the first shell and the second shell intersects with the first reinforcing portion provided on the other of the first shell and the second shell, when the pin is press-fitted into the insert hole of the boss, so as to position the first shell relative to the second shell in a direction in which the pin is press-fitted.

5. The sun visor for a vehicle according to claim 4, wherein the second reinforcing portion abuts on the first reinforcing portion at least two locations.

6. The sun visor for a vehicle according to claim 1, wherein the pin has a hollow interior.

7. The sun visor for a vehicle according to claim 1, wherein an inside diameter of the insert hole of the boss is smaller than an outside diameter of the pin.

8. The sun visor for a vehicle according to claim 1, wherein an outside diameter of the pin is reduced from a proximal portion of the pin toward a distal portion of the pin.

9. The sun visor for a vehicle according to claim 1, wherein the first shell has a first mating face as an edge portion of the first shell, and the second shell has a second mating face as an edge portion of the second shell, and the first reinforcing portion and the second reinforcing portion are provided on at least one of the first shell and the second shell, independently of the first mating face and the second mating face.

\* \* \* \* \*